US007831592B2

(12) United States Patent
Markl et al.

(10) Patent No.: US 7,831,592 B2
(45) Date of Patent: Nov. 9, 2010

(54) SYSTEM AND METHOD FOR UPDATING DATABASE STATISTICS ACCORDING TO QUERY FEEDBACK

(75) Inventors: Volker G. Markl, San Jose, CA (US); Peter Jay Haas, San Jose, CA (US); Ashraf Ismail Aboulnaga, San Jose, CA (US); Vijayashankar Raman, San Jose, CA (US); Felix Endres, Offenbach (DE)

(73) Assignee: International Business Machines Corporation, Armonk, NY (US)

( * ) Notice: Subject to any disclaimer, the term of this patent is extended or adjusted under 35 U.S.C. 154(b) by 1582 days.

(21) Appl. No.: 10/904,241

(22) Filed: Oct. 29, 2004

(65) Prior Publication Data

US 2008/0133454 A1   Jun. 5, 2008

(51) Int. Cl.
    *G06F 17/30* (2006.01)
(52) U.S. Cl. .................................................. 707/718
(58) Field of Classification Search ................ None
    See application file for complete search history.

(56) References Cited

U.S. PATENT DOCUMENTS

| | | | |
|---|---|---|---|
| 5,899,986 A | 5/1999 | Ziauddin | |
| 6,029,163 A | 2/2000 | Ziauddin | |
| 6,360,214 B1 * | 3/2002 | Ellis et al. | 707/2 |
| 6,389,430 B1 | 5/2002 | Parker | |
| 6,460,045 B1 | 10/2002 | Aboulnaga et al. | |
| 6,529,901 B1 * | 3/2003 | Chaudhuri et al. | 707/3 |
| 6,763,359 B2 | 7/2004 | Lohman et al. | |
| 7,299,248 B2 | 11/2007 | Popivanov | |
| 7,302,422 B2 | 11/2007 | Bossman et al. | |
| 7,412,439 B2 | 8/2008 | Bossman et al. | |
| 7,610,264 B2 | 10/2009 | Ewen et al. | |
| 7,647,293 B2 | 1/2010 | Brown et al. | |
| 2002/0198867 A1 * | 12/2002 | Lohman et al. | 707/3 |
| 2002/0198896 A1 | 12/2002 | Chaudhuri et al. | |
| 2003/0088579 A1 | 5/2003 | Brown et al. | |

(Continued)

OTHER PUBLICATIONS

Microsoft Corp., How SQL Server 7.0 and SQL Server 2000 Autostats Work, Article ID 195565, Oct. 25, 2004 Revision 5.0.

(Continued)

*Primary Examiner*—Luke S. Wassum
*Assistant Examiner*—Nicholas E Allen
(74) *Attorney, Agent, or Firm*—Jeffrey T. Holman

(57) ABSTRACT

An autonomic tool that supervises the collection and maintenance of database statistics for query optimization by transparently deciding what statistics to gather, when and in what detail to gather them. Feedback from data-driven statistics collection is simultaneously combined with feedback from query-driven learning-based statistics collection, to better process both rapidly changing data and data that is queried frequently. The invention monitors table activity and decides if the data in a table has changed sufficiently to require a refresh of invalid statistics. The invention determines if the invalidity is due to correlation between purportedly independent data, outdated statistics, or statistics that have too few frequent values. Tables and column groups are ranked in order of statistical invalidity, and a limited computational budget is prioritized by ranking subsequent gathering of improved statistics. Multiple tables can have their statistics refreshed over time, and the maintenance effort is concentrated on the most important tables.

18 Claims, 7 Drawing Sheets

U.S. PATENT DOCUMENTS

| | | | |
|---|---|---|---|
| 2004/0034643 A1 | 2/2004 | Bonner et al. | |
| 2004/0215626 A1* | 10/2004 | Colossi et al. | 707/100 |
| 2004/0225639 A1* | 11/2004 | Jakobsson et al. | 707/2 |
| 2005/0138015 A1* | 6/2005 | Dageville et al. | 707/3 |
| 2005/0149505 A1 | 7/2005 | Bossman et al. | |
| 2005/0234900 A1 | 10/2005 | Bossman et al. | |
| 2005/0278357 A1* | 12/2005 | Brown et al. | 707/100 |
| 2005/0289191 A1 | 12/2005 | Popivanov | |
| 2006/0149695 A1 | 7/2006 | Bossman et al. | |
| 2006/0195416 A1 | 8/2006 | Ewen et al. | |
| 2008/0033912 A1 | 2/2008 | Bossman et al. | |
| 2008/0046455 A1 | 2/2008 | Behm et al. | |
| 2008/0052038 A1 | 2/2008 | Popivanov | |
| 2009/0030875 A1 | 1/2009 | Bossman et al. | |

OTHER PUBLICATIONS

Automated Statistics Collection in DB2 Stinger, Aboulnaga A., P Haar, S. Lightstone, V. Markl, I. Popivanov, V. Raman, Proceedings of the 30TH VLDB Conference, Toronto, Canada, 2004.

IDUG 2004—North America, Automated Statistics Collection in DB2 Stinger, Markl Volker, IBM Research, Ivan Popivanov, IVM SWG, Session E11, Wednesday May 12, 2004.

DB2'S Learning Optimizer: Query Feedback Mining and Statistics Recommendations, Assistentenarbeit, Jun. 2-Aug. 29, 2003—Advisor Markl Volker, IBM Almaden, Felix Endres, IT 2001, IBM Deutschland GMBH.

FWH: Testing for Causes of Error, Peter Haas Jul. 15, 2003.

Definition and Notation—Markl Volker and Peter Haas.

Automatic Statistics Profiling (v8.2 LI 3119)—IBM Research, Leo, DB2 Learning Optimizer.

Sash: A Self-Adaptive Histogram Set for Dynamically Changing Workloads, Lupyeow Lim, Duke University, Min Wang, IBM Watson Research Ctr., Jeffrey Scott Vitter, Purdue University.

Oracle Database 10G Performance Overview, ORACLEWORLD 2003.COM.

Optimizing Oracel Optimizer Statistics, Mar. 1, 2004 by Donald K. Burleson.

Oracle 10G New Features: Easy Management, Feb. 11, 2004.

Keeping Long-Term 10G Performance Metrics, Apr. 13, 2004, Don Burleson.

An Oracle Instructors Guide to The Self-Managing Database, Part 1, by Chris Foot—DBAZINE.COM.

Adaptive Selectivity Estimation Using Query Feedback, Chungmin Melvin Chen, Nick Roussepoulos, Institute for Advanced Computer Studies, University of Maryland.

Leo—DB2'S Learning Optimizer, Michael Stillger, Guy Lohman, Markl Volker, IBM, Mokhtar Kandil, Siebel Systems.

Oracle Assures Local Customers of Smooth Migration to 10G, Grid Today, Mar. 15, 2004, V.3, N. 11, WWW.GRIDTODAY.COM.

I. Illyas, V. Markle, PA Haas, P. Brown, A Aboulnaga, "Cords: Automatic Discovery of Correlations and Soft Functional Dependencies", Proceedings of 2004 ACM SIGMOD, Jun. 2004.

V. Poosala, Y. Loannidis, P. Haas, E. Chekita, "Improved Histograms for Selectivity Estimation of Range Predicates", Proceedings of 1996 ACM SIGMOD, Jun. 1996, p. 294-305.

S. Chaudhuri, V. Narasayya, "Automating Statistics Management for Query Optimizers", Proceedings of the 16th International Conference on Data Engineering, San Diego, 2000.

S. Lighstone, G. Lohman, D. Zilio, "Toward Autonomic Computing With DB2 Universal Database", SIGMOD Record V. 31, N. 3 Sep. 2002.

S. Parekh, K. Rose, J. Hellerstein, V. Chang, S. Lighstone, M. Huras, "A General Approach to Polcy-Base Management of the Performance Impact of Administrative Utilities", DSOM 2003: 14th IFIP/IEEE International Workshop on Distributed Systems: Operations and Management, Oct. 20-22, 2003, Heidelberg, Germany.

S. Parekh, K. Rose, J. Hellerstein, V. Chang, S. Lighstone, M. Huras, "Managing the Performance Impact of Administrative Utitlities", Computer Science IBM Research Report, RC22864, Aug. 1, 2003.

S. Lighstone, B. Schiefer, D. Zilio, "Autonomic Computing for Relational Databases: The Ten Year Vision", IEEE Workshop on Autonomic Computing Principles and Architectures (AUCOPA 2003), Banff, Canada, Aug. 2003.

Q. Zhu, B. Dunkel, N. Soparkar, S. Chen, B. Chiefer, T. Lai, "A Piggyback Method to Collect Statistics for Query Optimization in Database Management Systems", Proceedings of the 1998 Conference of the Center for Advanced Studies on Collaborative Research, Toronto, Canada, p. 25, 1998.

* cited by examiner

```
// G, P, D, Q, C are lists of tables
// T is a table
G := tables to be checked by AA in initial maint. window
P, D, Q, C := {}
while(true)
{
   // Call the AA on the Tables in G
   D := AA(G);
   // Call the Query Feedback Analyzer
   Q := QFA();
  // prioritize D and Q based on the ranking criteria
  // and merge with list of critical tables C
   P := prioritizeMerge(D, Q, C);
    while (still time in maintenance window)
    {
        T := Pop(P); // T is table in P with highest priority
        execute RUNSTATS on T;
    }
   // Construct list for next maintenance interval
   (G, C) := constructDueTables()
   sleep until the next maintenance window;}
```

FIG 7

SYSTEM AND METHOD FOR UPDATING DATABASE STATISTICS ACCORDING TO QUERY FEEDBACK

FIELD OF THE INVENTION

This invention relates to database query optimization. Specifically, the invention automatically determines how to configure and update the statistics used to select the best query plans for fastest execution, according to stored feedback gathered during previously executed queries.

RELATED ART

The following commonly-owned and commonly-assigned patents and patent applications are incorporated in their entirety herein by reference: U.S. Pat. No. 6,763,359, U.S. Ser. No. 10/864,463 "Detecting Correlation From Data" filed on Jun. 10, 2004, and U.S. Ser. No. 10/885,532 "Method, System, and Program for Determining Frequency of Updating Database Histograms" filed on Jun. 29, 2004. An article by A. Aboulnaga, P. Haas, S. Lightstone, V. Markl, I. Popivanov, and V. Raman entitled "Automated Statistics Collection in DB2 Stinger", Proceedings of the $30^{th}$ VLDB Conference, Toronto, Canada, 2004, describes the invention and is also incorporated in its entirety herein by reference.

BACKGROUND OF THE INVENTION

Query optimizers in relational database management systems (DBMSs) use database statistics to determine the best query execution strategy for a query. The statistics usually include the number of rows in a table, the number of distinct values for a column, histograms of the distribution of data values in a column, the number of distinct index keys, and the most frequent values in a column. The optimizer uses these statistics to compute the cardinality (i.e. the number of rows processed) at each intermediate step of a query execution plan (QEP). Advanced optimizers also use joint statistics on groups of columns in order to deal with possible correlations between column values. In addition, many query optimizers also utilize statistics for physical parameters, like the clustering of a table or an index, or the height of a B-tree index.

Missing, out-of-date, or otherwise erroneous database statistics cause the optimizer to improperly estimate the cardinalities and costs of the steps in a QEP, which results in a poor choice of QEP and hence unacceptably long query processing times. Unfortunately, it is all too easy for the statistics in a DBMS to deteriorate over time. Database statistics are not always updated incrementally during data manipulations such as insert, delete, update, and load operations, because such incremental maintenance is expensive. Statistics for tables with high data change rates are therefore very likely to be out of date.

Moreover, some statistics require the proper setting of configuration parameters in order to optimally model the database. Example parameters include the number of frequent values and the number of quantiles (histogram buckets) that should be used when creating a synopsis of the data. These parameters heavily depend on the nature of the data, and its distribution. If not configured properly, the optimizer will again use inaccurate estimates and perform poorly.

While query optimizers often do good job of estimating both the cost and the cardinality of most queries, many risky assumptions underlie these mathematical estimates. Examples of these assumptions include currency of information, data uniformity, and independence of predicates. The statistics are assumed to reflect the current state of the database, i.e. that the database characteristics are relatively stable, and that's not always the case. Furthermore, while histograms deal with skew in values for local selection predicates (e.g. to a single table), no available commercial product is known to exploit them for joins.

Regarding independence of predicates, selectivites for each predicate are calculated individually and multiplied together, even though the underlying columns may be related, perhaps by a functional dependency. The selectivity for a join predicate X.a=Y.b is typically defined to be $1/\max\{|a|, |b|\}$, where $|b|$ denotes the number of distinct values of column b. This implicitly assumes the "principle of inclusion", i.e. that each value of the smaller domain has a match in the larger domain. When these assumptions are invalid, significant errors in the cardinality (and hence cost) estimates result, causing sub-optimal plans to be chosen. Thus, the primary cause of major modeling errors is usually the cardinality estimate on which costs depend. Cost estimates might be off by 10 or 15 percent at most for a given accurate cardinality, but cardinality estimates can themselves be off by orders of magnitude when their underlying assumptions are invalid. While multidimensional histograms address this problem for local predicates, they have apparently never been applied to join predicates, aggregations, etc. Also, applications today commonly have hundreds of columns in each table and thousands of tables, making it impossible to know on which subsets of columns to maintain multidimensional histograms.

Configuration and maintenance of these statistics has traditionally been a time-consuming manual operation, wherein a database administrator continually monitors database behavior and refreshes the statistics as the data changes. The administrator must also occasionally adjust the set of statistics that are maintained, and perhaps reschedule statistics collection. As databases increase in size, the administrator's task becomes more difficult to manage.

Several known databases try to solve this problem by providing statistics refresh automation features that are based on data change rate detection. These tools essentially automate statistics refresh on all tables where the percentage of update-delete-insert (UDI) operations exceeds a threshold. Unfortunately, this involves a substantial maintenance overhead cost.

Chaudhuri et al. describe a method used in the Microsoft (R) SQL Server that analyzes the query workload in order to select a set of statistics to maintain, such as multidimensional histograms. This static analysis is performed prior to query execution. Chaudhuri's work is described in "Automating Statistics Management for Query Optimizers", by S. Chaudhuri and V. Narasayya, in the Proceedings of the $16^{th}$ International Conference on Data Engineering, San Diego, 2000, which is hereby incorporated by reference.

Zhu et al. describe a piggybacking technique for collecting statistics that observes the data scanned during normal data manipulation language (DML) processing. This technique avoids the asynchronous background refresh of table data statistics, but has the significant drawback of incurring a constant overhead for all DML processing. While the overhead for any one SQL statement may be small, the cumulative overhead can be significant. Zhu's work is described in "A Piggyback Method to Collect Statistics for Query Optimization in Database Management Systems", by Qiang Zhu et al., in the Proceedings of the 1998 Conference of the Centre for Advanced Studies on Collaborative Research, Toronto, 1998, p. 25, which is hereby incorporated by reference.

In contrast to these approaches, U.S. Pat. No. 6,763,359 describes a database system that learns from empirical performance results gathered during query execution. The query optimizer generates alternative QEPs for executing a query, provides an execution model of each QEP that includes an execution cost estimate, and selects one of the QEPs for execution based on the associated model. However, the model is validated by empirical measurements made during execution. If the measurements indicate the model is in error, then adjustments to the model are computed to correct the error.

Pending patent application U.S. Ser. No. 10/864,463 cited above describes a method for discovering dependencies between database column pairs for improved query optimization. As mentioned above, the assumption that query predicates are independent, when in fact the relevant underlying columns are related, is a major source of error. Thus, data values are sampled randomly prior to query execution, and column pairs are tested for functional dependency and statistical correlation, and accordingly prioritized for recommendation to the query optimizer. Statistics for the recommended column pairs are tracked to improve the estimates of predicate selectivity.

While these accomplishments have improved database performance, an autonomic database system is needed that fully frees the database administrator from the tedium of supervising the collection and maintenance of database statistics. Neither a UDI-driven nor a query feedback (QF)-driven approach is entirely sufficient by itself. UDI-driven approaches are proactive and therefore can handle unforeseen queries, but may not concentrate enough effort on maintaining statistics that are critical to the users' workload. QF-driven approaches are reactive and thus require some learning time, but they focus on the most critical statistics, and hence use system resources very efficiently.

SUMMARY OF THE INVENTION

It is accordingly an object of this invention to provide a system, method, and computer program product for managing database statistics used to select the best QEPs for fastest execution. The invention may also constitute a service that can help automate many of the tedious tasks currently performed by a database administrator by transparently deciding what statistics to gather, when and in what detail to gather them without needing database administrator intervention.

In an exemplary embodiment, the system is an autonomic database component that collects feedback information, stores the information in a feedback warehouse, then mines the information to recommend statistics correction. Collected query feedback information includes, for example, query predicates and the actual and estimated cardinalities for each such relational query expression. The size of the feedback warehouse is limited, and gathering statistics is computationally expensive, so the program product minimizes overhead by selectively gathering and storing statistics only where most effective, and systematically purging older statistics and query feedback.

Data feedback-driven approaches based on modifications to stored data are proactive and can handle unforeseen queries, but employ no information about what improved statistics should be collected except that the data has changed. Query feedback-driven approaches are reactive and require some learning time, but focus on the estimated and actual performance results of previous queries and thus will not waste time collecting and storing unnecessary statistics on all data. Query execution is improved by simultaneously combining feedback from data-driven statistics collection with feedback from query-driven learning-based statistics collection. Queries are thus accelerated for both rapidly changing data and for data that is actually queried frequently. The invention schedules statistics collection that combines and prioritizes the recommendations from both the UDI-driven and QF-driven analyses so that subsequent queries will be expedited.

The invention programmatically monitors table activity and decides if the data in a table has changed sufficiently to require a refresh of invalid statistics. The invention determines if the invalidity is due to correlation between purportedly independent data, outdated statistics, or statistics that have too few frequent values, and then advises appropriate corrective action. If the statistics are outdated, the invention determines if feedback is available for a particular table, then compares estimated versus actual values to conclude whether the available feedback is still accurate.

Column correlation is detected based on actual and/or estimated selectivity (and/or cardinality) values for predicates involving these columns. The invention assumes data independence for selectivity estimation and then checks whether the actual selectivities support this assumption. If the assumption is not supported sufficiently, then more detailed statistical monitoring of the data is recommended.

Tables and column groups are ranked in order of estimation error, and the allocation of a limited computational budget is prioritized by ranking the recommended statistics for subsequent gathering. Multiple tables can have their statistics refreshed over time, and the maintenance effort is concentrated on the most important tables.

The foregoing objects are believed to be satisfied by the exemplary embodiment of the present invention as described below.

BRIEF DESCRIPTION OF THE DRAWINGS

FIG. 7 is a summary of a scheduling algorithm for statistics collection, according to an embodiment of the invention.

DETAILED DESCRIPTION OF THE INVENTION

Figure 1:
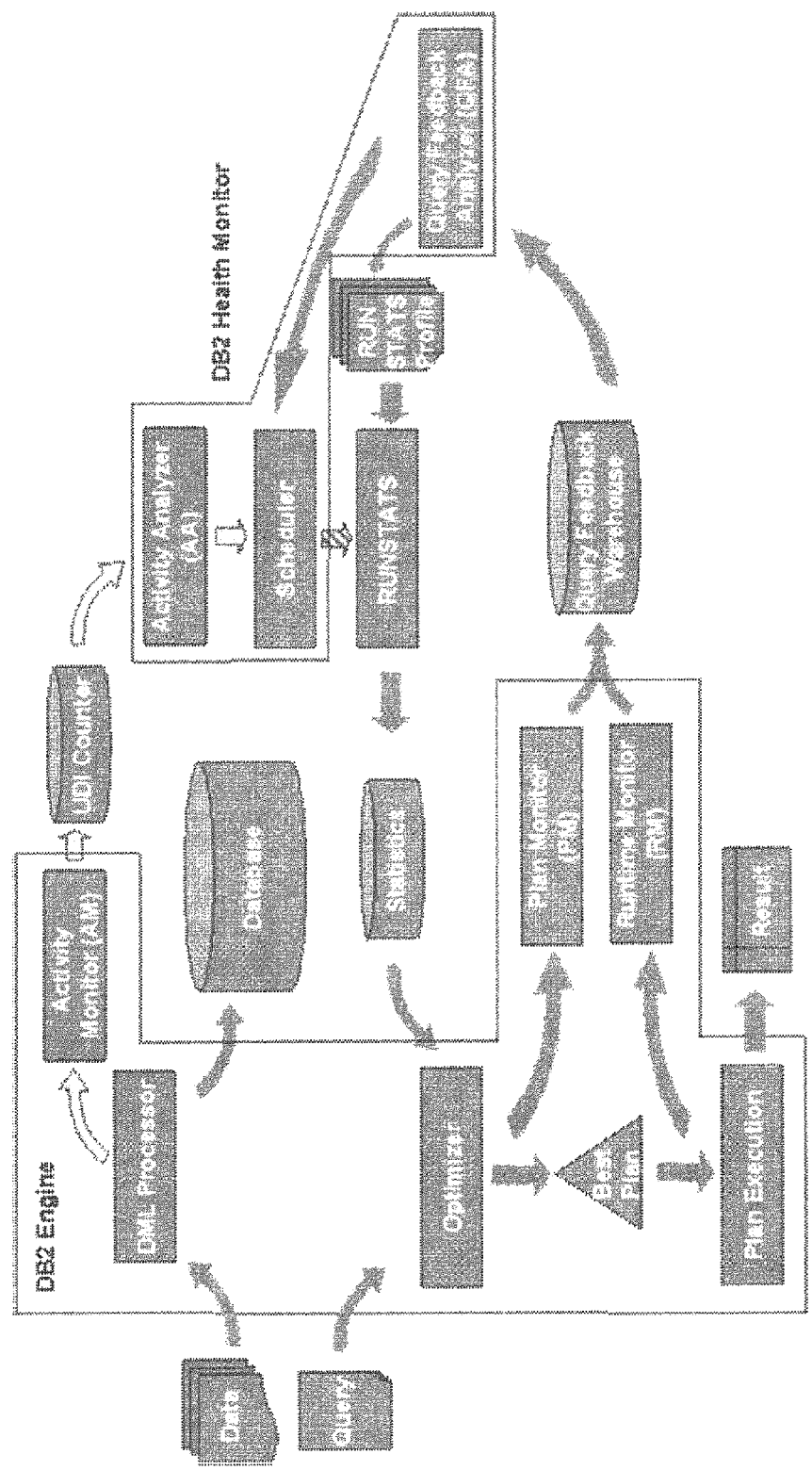
FIG. 1 is a diagram of the overall architecture of the invention, according to a preferred embodiment of the invention.

Referring now to FIG. 1, the overall architecture of the overall system for automatic statistic collection is shown. The invention introduces both a UDI-driven and a QF-driven autonomic process into the DB2 system. DB2 stores in the system catalog the statistics pertinent to each table, including overall properties of the table, detailed information about the columns in the table, and information about any indexes on columns of the table. The DB2 optimizer uses the information in the catalog when selecting a QEP.

In DB2, a process called RUNSTATS collects statistics, which are used by the optimizer to analyze and to compare different plans for accessing the physical data. The invention determines when and how to run RUNSTATS to correct erroneous cardinality estimates by detecting outdated, missing, and incorrectly specified statistics, and by generating statistical profiles based on query feedback. Statistics collected by RUNSTATS are a crucial input that the optimizer uses to determine the most efficient access plan for any given query. Missing statistics for important queries, out of date statistics, or a wrong characterization of the distribution function approximated by the statistics could easily make the optimizer pick up a plan orders of magnitude slower than other alternatives. Hence, the statistics are crucial for the overall performance of a database management system on any customer workload.

This invention removes the burden of setting the parameters for RUNSTATS and running the RUNSTATS utility from the database administrator. Instead, there will be a background process scheduled based on query feedback that determines that statistics are outdated, missing, or not characterized by the right number of frequent values or histogram buckets. The process corrects for that by creating or enhancing the statistical profile (the set of columns/column groups and distribution parameters for each column or column group) for each table where statistics have been detected to be outdated, characterized incorrectly, or missing. This automation makes the statistic collection transparent to the end user, which is a vital requirement for small-to-medium business customers.

The DB2 RUNSTATS utility collects the statistics and populates the system catalog tables. RUNSTATS is executed on a per table basis, and for any given table the user can specify the specific columns and indexes on which statistics are to be created. The exact configuration parameters for RUNSTATS on each table (i.e., the set of columns on which to gather statistics, the number of quantiles and frequent values to collect for a column, the set of column-group statistics to maintain, etc.) are recorded in a RUNSTATS profile. RUNSTATS profiles are stored in the system catalog and can be modified through the RUNSTATS command and queried through SQL.

The UDI-driven process monitors table activity and recommends execution of RUNSTATS on a table whenever UDI or load statements against this table have changed the data distribution so that the present statistics for that table are substantially outdated. The QF-driven process monitors query results on a table. This process modifies the RUNSTATS profile and/or recommends execution of RUNSTATS whenever it detects either that the configuration parameters have been set improperly or that the statistics are outdated. The scheduler component combines the output of these two processes and triggers the execution of RUNSTATS on appropriate sets of tables and at appropriate times. In general, the scheduler causes RUNSTATS to be executed on one or more tables during a "maintenance iteration" which occurs within a specified time period called a "maintenance window". The frequency and length of maintenance windows can be controlled by the DBA.

The left side of FIG. 1 depicts functionality that is implemented in the DB2 engine, i.e., the query processor with optimizer and plan execution, the data manipulation language (DML) processor, and the monitors that facilitate several of DB2's autonomic capabilities. The right side of FIG. 1 depicts several analyzers and a scheduler that have been added to the DB2 Health Monitor to realize automated statistics collection. The analyzers periodically investigate the output of the monitors and recommend to the scheduler a set of tables on which to collect statistics.

The upper portion of the FIG. 1 pertains to the UDI-driven autonomic process. When changing the data in a table according to a UDI or load statement, the DML Processor not only modifies the database, but also sends information to an activity monitor (AM) that records the number of changes against each table using a UDI-counter. The activity analyzer (AA) uses this information to determine whether statistics on an active table have changed enough to justify statistics collection for this table. The AA also estimates the degree to which activity on a table has altered the data distribution. The scheduler uses such estimates to prioritize tables for statistics collection. To avoid starvation, "critical" tables that have been ignored over many past maintenance iterations are scheduled for processing regardless of UDI activity.

The lower portion of FIG. 1 pertains to the QF-driven autonomic process. This process observes query activity by using a plan monitor (PM), which stores the best plan together with the optimizer's cardinality estimate for each intermediate result. During plan execution, a runtime monitor (RM) observes the actual cardinalities. All of this compile-time and runtime information is stored in a query feedback warehouse (QFW) in the form of relational tables. A query feedback analyzer (QFA) periodically reviews these tables in order to derive modifications to the RUNSTATS profile for individual columns, column groups, or tables. The QFA bases these modifications on the discrepancy between actual and estimated cardinalities. Besides modifying RUNSTATS profiles, QFA communicates to the scheduler its findings about tables with modified RUNSTATS profiles and tables with outdated statistics, so that the scheduler can properly prioritize the automatic execution of RUNSTATS.

The overall statistics collection process, as with any other background maintenance task, must not significantly impede more important business-critical tasks. Therefore, the scheduler executes RUNSTATS as a "throttled" background process in order to guarantee that the user workload is not slowed down by more than a specified amount. The scheduler exploits DB2's general mechanism for adaptively tuning resource consumption during process execution. This mechanism is used to manage other expensive maintenance processes such as database backup and table reorganization.

To summarize, this invention introduces two autonomic feedback loops into a database system, a data-centric one and a query-centric one. The first feedback loop monitors table activity and triggers statistics collection (the RUNSTATS process) on a table in a throttled background process, whenever update, delete, insert (UDI) or load statements against this table have changed the data distribution so that the present statistics for that table are substantially outdated. The second feedback loop monitors query activity on a table and modifies the RUNSTATS profile (the proper settings of the statistics configuration parameters for that table) whenever it detects, based on query feedback, that the statistics parameters have been configured improperly.

Figure 2:
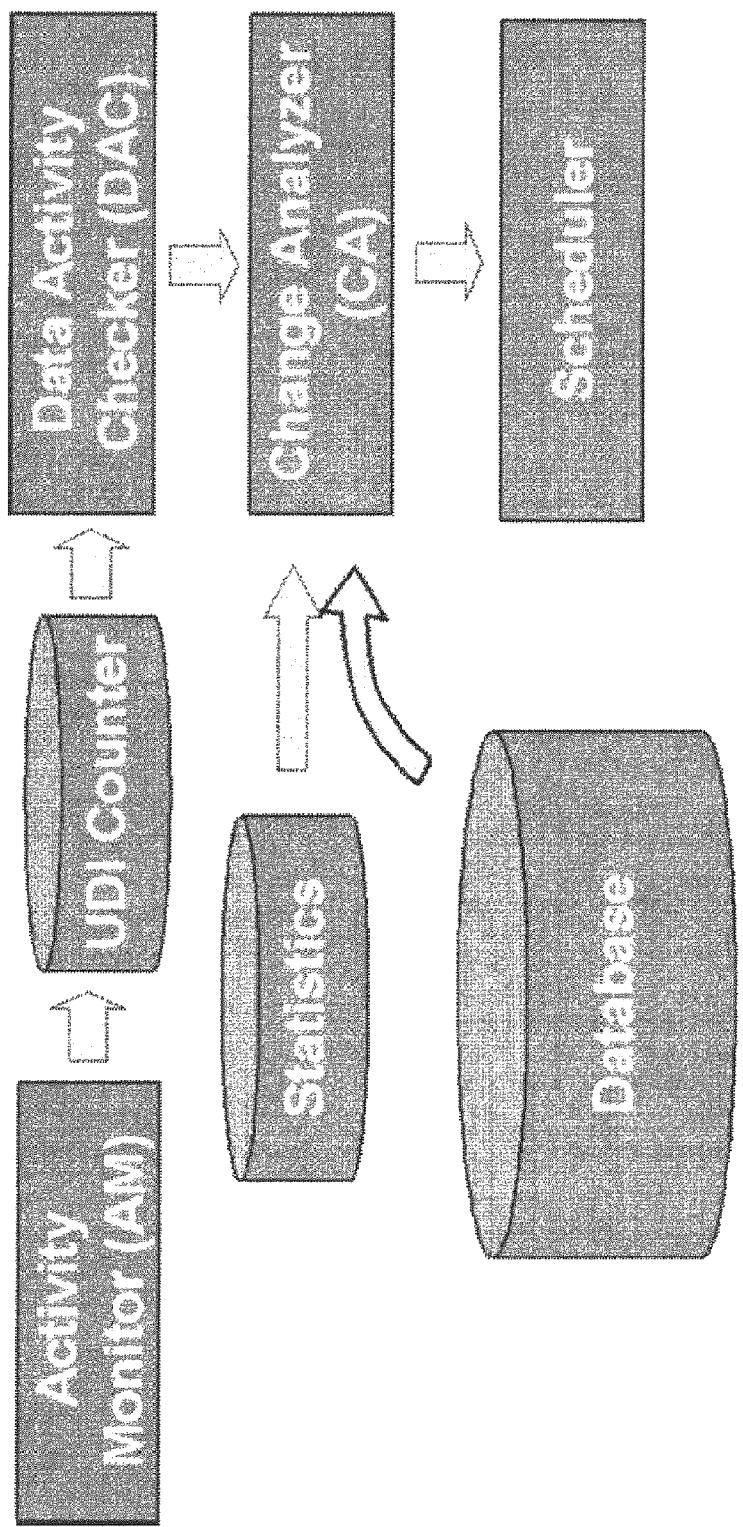
FIG. 2 is a diagram of the UDI-driven autonomic process, according to an embodiment of the invention.

Referring now to FIG. 2, the UDI-driven feedback loop to automated statistics collection is shown. The UDI-driven autonomic process analyzes both the number of UDI and load operations and the changes in data values to determine whether the statistics on a table T have changed sufficiently so that statistics collection is justified. The process takes as input a list G of tables to be checked, as provided by the scheduler, and its output is a prioritized list of tables D, where D is a subset of G.

As can be seen in FIG. 2, the activity analyzer comprises two components. The data activity checker (DAC) is first executed to ensure that only tables with a reasonably large amount of data activity are considered for statistics collection. Each table in G that is not eliminated by the DAC is inserted into D. The list D is then passed to a change analyzer (CA). For each table T in D, the CA estimates for each "analyzable" column in T the degree of change in the data distribution since RUNSTATS was last executed on T; a column is analyzable if quantile statistics for the column are maintained in the system catalog. If no analyzable column in T evidences a significant degree of change, then T is removed from D.

After execution of the CA, the list D contains only those tables having both significant data activity and significant changes in data values in at least one column. This list is then passed to the scheduler. The various components of the detection process are now described in more detail.

The task of the activity monitor (AM) is to quantify the update activity for each table. It takes two different factors in account: loading of data into a table and UDI operations on a table. The AM maintains a UDI-counter for each table. The counter is increased by 1 whenever an existing row is updated or deleted, or a new row is inserted. The counter is set to 0 when the table is created and is reset to 0 whenever RUNSTATS is executed on the table.

The UDI-counter is stored in the table descriptor together with other internal data structures. It is usually cached in memory and flushed to disk using the same discipline as for the rest of the data structures. Therefore maintenance of the UDI-counter rarely causes extra I/O operations.

The DAC is the first process invoked when searching for outdated statistics because the presence of data activity is necessary in order for statistics to change. Lack of data activity means statistics need not be updated unless the QF-driven process gives a different indication, i.e., unless the QFA modifies the configuration parameters for some statistics or detects outdated statistics. This multi-tier approach significantly reduces the number of maintenance tasks performed over time. Tables with either low data activity or marginal changes to the statistics are ignored, so that system resources can be devoted to maintaining the most important tables. Tables with high table activity but relatively stable statistics are quickly identified. The maintenance resources are used primarily to maintain statistics on tables with fast changing statistics, keeping the statistics for these up-to-date over time.

To summarize:
Consider tables that are changing:
If a table hasn't been accessed by the workload, it is considered irrelevant to the workload and no maintenance is performed.
If a table is not modified actively (low number of Updates/Deletes/Inserts) then there is no need to update statistics because statistics change when the data changes (but not vice versa).
Sampling to confirm that the statistics have changed: The table is sampled only if it is large enough. For example, if the table has more than 4000 pages, 2000 of them are sampled and statistics are collected over the sample.
Compare the sample statistics against the table statistics to determine whether there are significant changes: Only the distribution statistics and more specifically the histograms are compared. If there are changes in the distribution of the data, then RUNSTATS is executed.
Collect table statistics: If table statistics are identified as outdated, RUNSTATS is executed.
Compare the new and the previous table statistics to decide how often to maintain this table: If the statistics are changing the table is "maintained" (this procedure is repeated) more frequently. Otherwise, the table is maintained less frequently.

The DAC first verifies that the table-related data structures are cached in memory. Their absence from the cache means that the table has not been used recently; it follows that the table has low data activity and can be ignored. Otherwise, the table is considered to be a candidate for statistics collection, and the DAC inspects the UDI-counter maintained for that table. If the UDI-counter suggests that at least x % of the rows have been modified, this table is passed on to the change analyzer to further investigate whether statistics on this table need to be collected. The current implementation of DAC uses a value of x=10.

It is possible that in some unusual cases a small number of records in a given table are changed, but the data values in these records are altered so drastically that query performance is affected. In this case, the table may not be detected by the DAC, and hence the AA. If this table is referenced in the query workload, however, then it will be detected by the QFA.

For each table T in its input list D, the CA takes a small sample from T and computes a synopsis data structure S=S(T), where S comprises histograms of the marginal data distribution for each analyzable column. A sample consisting of about 2000 pages of table data, selected using page-level Bernoulli sampling, provides sufficient statistical precision. The CA also obtains an analogous synopsis R=R(T) based on the (possibly outdated) data distribution information for the columns of T that are stored in the system catalog. For each analyzable column, the CA then measures the "distance" between the histograms, and deletes table T from D, i.e., declares the change in data values to be insignificant if and only if, for each analyzable column, the distance lies below a specified threshold. If the change is significant for at least one analyzable column, then the CA leaves table T in D and, as described below, assigns T a priority that the scheduler can use to determine when to update T relative to other tables.

Statistics collection, as any other background maintenance task, must not have a significant impact on more important business critical tasks. The invention guarantees the statistic collection will not impact the user workload beyond a certain threshold. Notice that this threshold is observed only if the workload on the system is high. For example, if half of the resources are unused, then the statistics collection background processes will use as much resources are available. The resources consumed are adaptively tuned during at runtime, which allows a background maintenance task to complete as soon as possible without disturbing critical workloads. The adaptive resource consumption (called "throttling" in DB2) is implemented for statistics collection and other expensive maintenance utilities (e.g. database backup, table reorganization). In order to control the behavior of autonomic background activities, the database administrator can configure the scheduler by modifying the DB2 policy for automated statistics collection. For instance, the administrator can limit the scope of automated statistics collection to certain tables, and specify the maintenance time window to define time intervals at which the RUNSTATS process should be executed. The administrator can also control whether the scheduler should call QFA, AA, or both, and specify the maximum amount of disk space to be used for the feedback warehouse.

Figure 3:
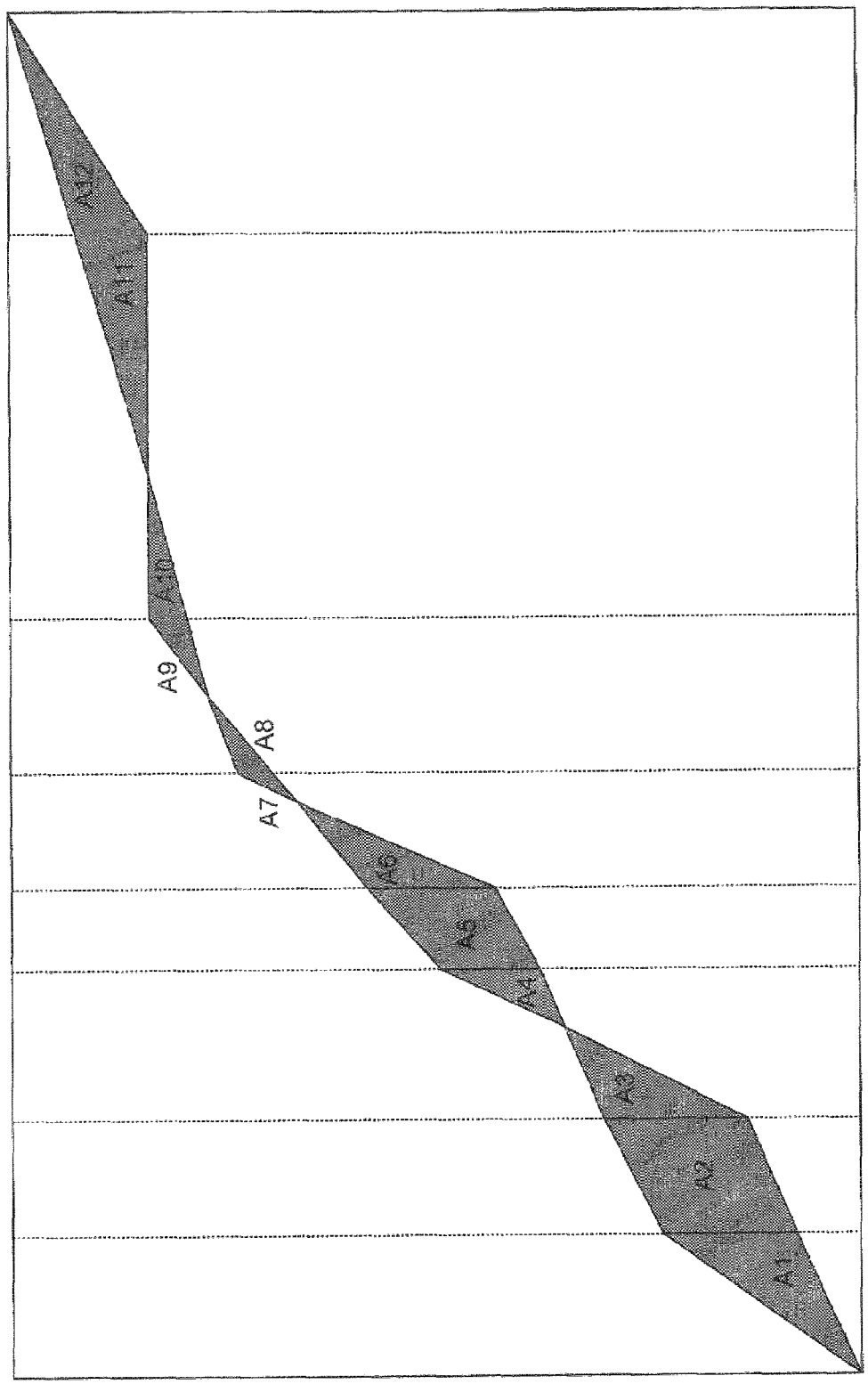
FIG. 3 is a diagram depicting the computation of changes in data values to determine correlation, according to an embodiment of the invention.

Referring now to FIG. 3, the computation of changes in data values to determine correlation is shown. For a fixed analyzable column T.C (assumed to contain numeric data) the invention uses a normalized L1 distance to measure the change in the data distribution. Specifically, denote by $e_Y$(T.C $\leq$v) the cardinality estimate for the predicate T.C$\leq$v based on synopsis Y and by l and u the smallest and largest bucket boundary points that appear in R and S. Then $$\text{change}(T.C, R, S) = \frac{1}{|u-l|} \int_{l}^{u} |e_R(T.C \le v) - e_S(T.C \le v)| \, dv$$

Observe that change (T.C, R, S) can be interpreted as the average absolute discrepancy in cardinality estimates over a family of one-sided inequality predicates.

Suppose that the histogram of T.C values is represented by a set of bucket boundaries (typically quantiles) in both synopses R and S. Then change (T.C, R, S) can be computed in a simple manner using essentially a "line sweep" algorithm. Specifically, determine the union of the two sets of bucket boundaries, and observe that $e_R(T.C \le v)$ and $e_S(T.C<v)$ are linear and monotonically increasing functions of v over each subinterval defined by a pair of successive bucket boundary points. Thus the integral $$\int_{I} |e_R(T.C \le v) - e_S(T.C \le v)| \, dv$$

can be represented as the area of the region that lies between two piecewise-linear curves, e.g., the shaded region in FIG. 3, where the dashed lines correspond to the combined bucket boundaries. This area can in turn be expressed as a sum of areas of simple trapezoids and triangles, each of which is quick and easy to compute. See previously-cited patent application U.S. Ser. No. 10/885,532 for more detail. Summing these areas and dividing by l–u yields the value of change (T.C, R, S).

If change (T.C, R, S)>θ for at least one column, where θ is an empirically determined threshold value, then the CA concludes that data distribution has changed and table T is a candidate for statistics collection with priority equal to $\max_C$ change (T.C, R, S).

Figure 4:
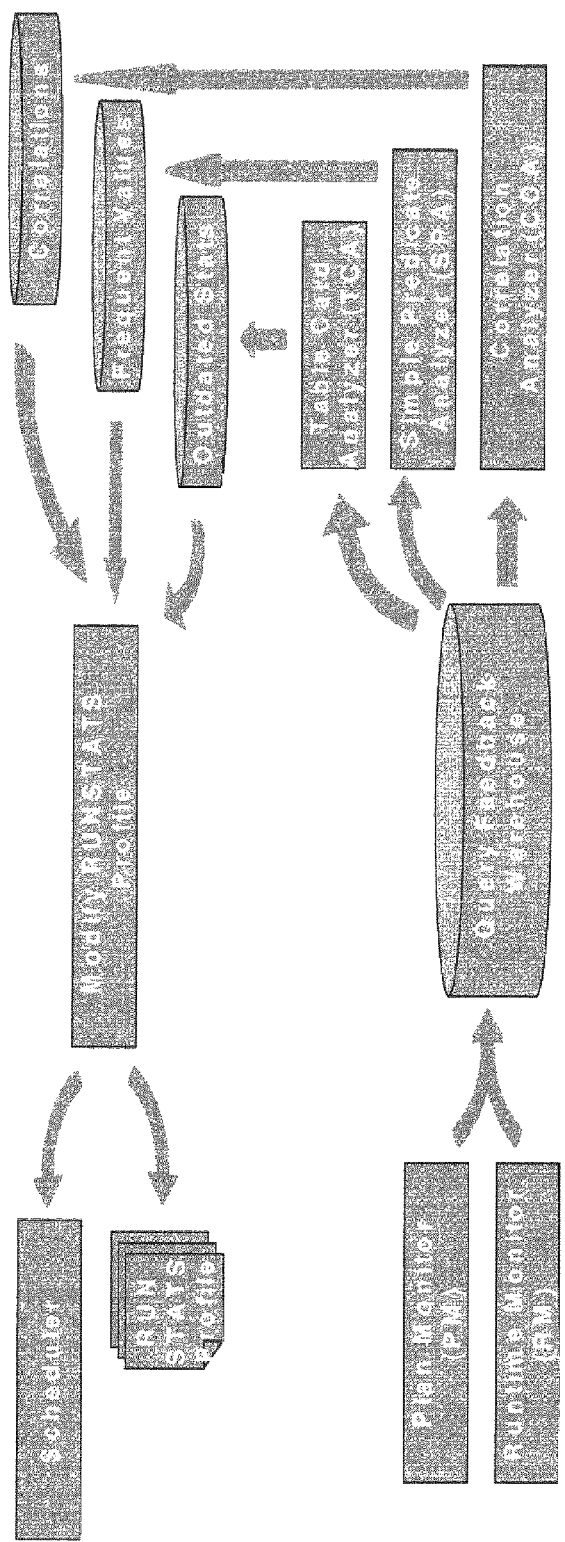
FIG. 4 is a diagram of the QF-driven autonomic process, according to an embodiment of the invention.

Referring now to FIG. 4, the QF-driven autonomic process is shown. This process monitors query execution and records estimation errors in the QFW. The QFA analyzes the data in the QFW to determine which tables have outdated statistics, whether and how the frequent values for columns on a particular table should be reconfigured, and which correlation statistics should be created in order to reduce estimation errors in the future. As shown in FIG. 4, the QFA comprises three components. The table cardinality analyzer (TCA) detects whether statistics are outdated by comparing the estimated and actual size of a table. The simple-predicate analyzer (SPA) uses estimated and actual cardinalities of simple equality predicates to determine the number of frequent values that should be used when creating the statistics for a particular column. The correlation analyzer (COA) uses cardinality information about tables, simple equality predicates, and conjunctive predicates to determine the set of column group statistics to recommend to the scheduler. The output of the QFA is a prioritized list of tables Q that require statistics collection, along with the configuration parameter changes for the statistics of each table. The list Q is sent to the scheduler, and the configuration changes are stored in the RUNSTATS profile.

Query-centric configuration of statistics collection uses a feedback loop that monitors query execution in order to populate a query feedback warehouse with estimation errors, analyzes that warehouse to determine: which tables have outdated statistics, whether and how the frequent values for columns on a particular table should be reconfigured, and which correlation statistics should be created in order to reduce estimation errors in the future. The output of the query feedback analyzer includes (1) a prioritized list of tables Q, which require statistics collection, communicated to the scheduler, as well as (2) the configuration parameter changes for the statistics of each table, stored in RUNSTATS profiles.

Only dynamic SQL queries without parameter markers are monitored (and thus incur runtime overhead due to monitoring). Static queries are not monitored. However, if static queries are compiled they will benefit from all statistics profile information that has been learned until then, as will queries with parameter markers if a reoptimization priority override is supported for those kinds of queries. Currently, the invention will only recommend column group statistics for column pairs on a single table, and only feedback from predicates of the form column_1=literal_1 AND . . . AND column_n=literal_n is considered for determining frequent values or column group statistics. Column groups involving more than two columns are not supported at present in the DB2 implementation, though the invention is not limited so.

Figure 5:
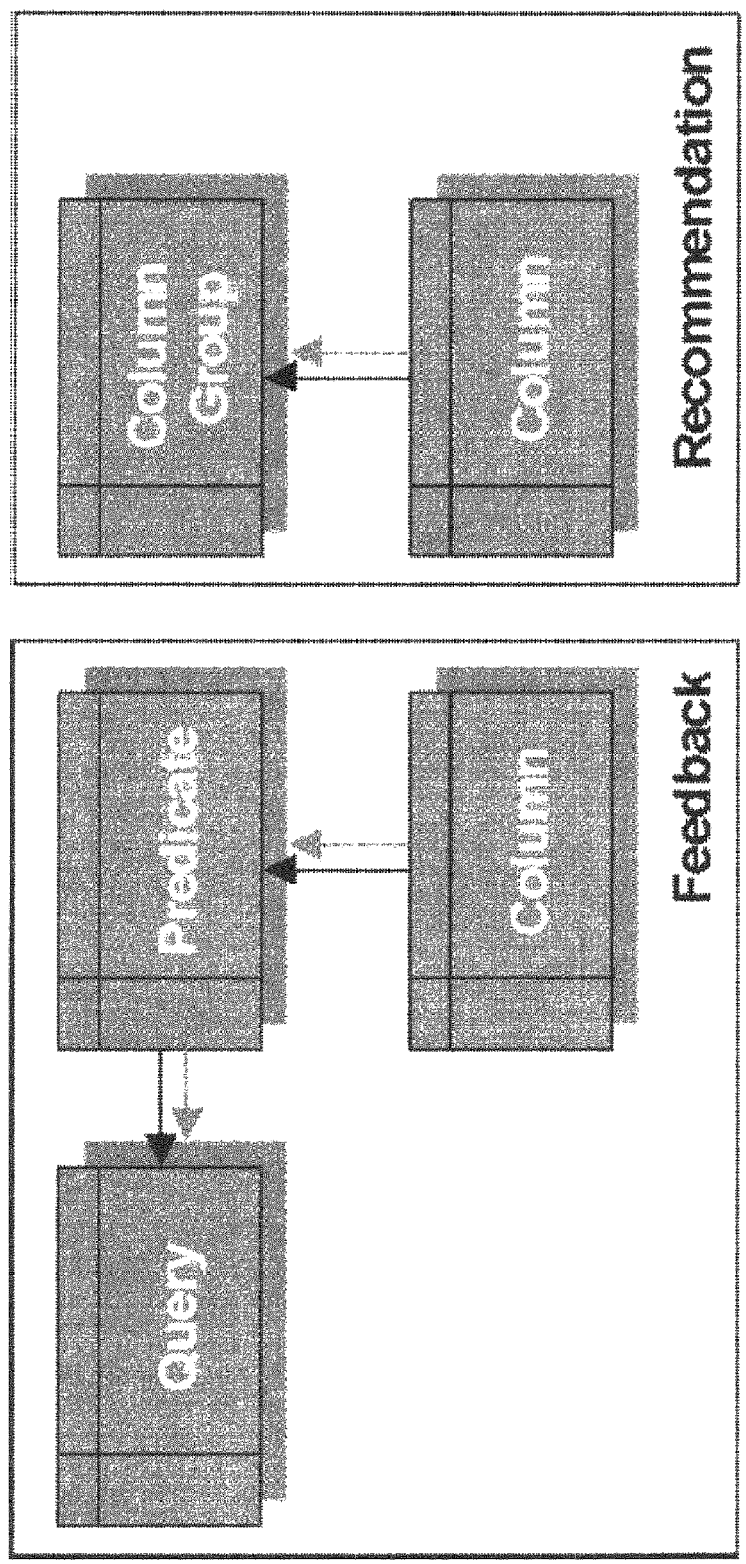
FIG. 5 is a diagram of the query feedback warehouse, according to an embodiment of the invention.

Referring now to FIG. 5, the query feedback warehouse is shown. The QFW is populated periodically using the information generated by the PM and the RM. For each query, the PM records, at compile time, the predicates in the query (i.e., the column names, relational operators, and values) along with the optimizer's cardinality estimate for each predicate. The RM records runtime information about each query that includes the actual cardinalities for each table and predicate and the actual values of parameter markers or host variables used in a query. The entire query, along with a skeleton query plan, is stored in the feedback query table. The feedback predicate table stores detailed information about each predicate (assumed conjunctive) of a query, including the table to which the query is applied and the number of "Boolean factors," i.e., the number of conjuncts in the predicate. A predicate can have several Boolean factors, each of which generates an entry in the feedback column table that contains the column name, relational operator, and literal of the predicate. The literal may come from either PM (in case of hard-coded predicates) or RM (in case of parameter markers or host variables).

The recommendations of the QFA concerning outdated statistics, frequent values, and correlations are also stored in the QFW. Column information for these recommendations (i.e., column name and number of frequent values) is stored in the recommendation column table, column groups are stored in the recommendation column group table. The QFW is an autonomic component of DB2 in its own right. It automatically purges old data, when necessary, and it never grows beyond a DBA-specified size.

The QFA processes the query feedback stored in the QFW and generates recommendations for correcting cardinality estimation errors in the future. The QFA proceeds by measuring, classifying, aggregating, and prioritizing the differences between optimizer-based cardinality estimates and actual cardinalities. Cardinalities considered include those for table size, for simple equality predicates of the form COLUMN="literal", and for pairwise conjuncts of simple equality predicates. The QFA determines the cause of each estimation error by sequentially executing the table cardinality analyzer, the simple-predicate analyzer, and then the correlation analyzer. The QFA then aggregates the errors for each table, prioritizes the tables, and communicates its results to the scheduler and to RUNSTATS. Each of these operational phases is described in more detail below.

The TCA simply compares the actual cardinality of each table in the feedback warehouse with the estimated cardinality based on the system catalog statistics. A discrepancy indicates that the statistics for this table are out of date. (This analysis is similar in spirit to the use of the UDI-counter by the DAC.)

For each column represented in the QFW, the SPA examines the errors in the simple equality predicates involving that column to check whether the number of frequent values maintained for the column in the system catalog is sufficient. If not, then the SPA automatically recommends an appropriate number of frequent values to maintain. Note that such a following such a recommendation also results in bring the frequent-value statistics up to date.

Use of frequent-value statistics minimizes estimation errors arising from skew in the column-value frequencies. It is difficult, however, for a DBA to manually determine the "right" number of frequent values to track. The automated approach used by the SPA is as follows. First the SPA scans the QFW and the system catalog to compile a list of all "known" value frequencies for the column. These include The frequencies $fv_1 \ldots fv_n$ of the currently maintained frequent values, as recorded in the system catalog.

The frequencies $cfv_1 \ldots cfv_m$ of all values for which there is a relevant error record in the QFW. These values can be considered as candidate frequent values to maintain.

An average frequency assigned to each of the remaining "rare" (i.e., infrequent) values, computed using a uniformity assumption from the estimated number of rows in the table and distinct values in the column.

When multiple frequency estimates are available for a given column value, the SPA uses the most recent one.

Figure 6:
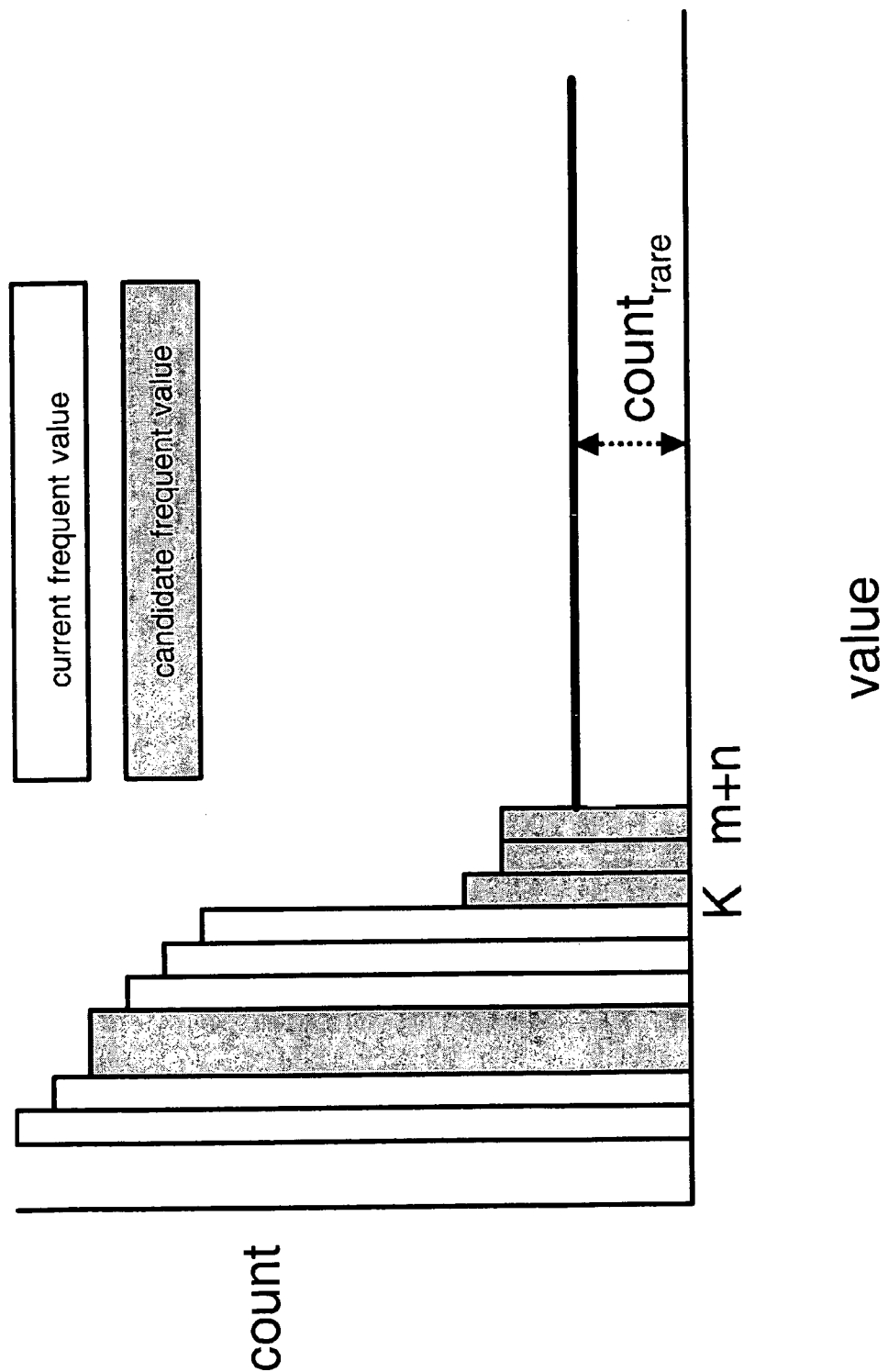
FIG. 6 is a diagram depicting the use of frequent-value statistics, according to an embodiment of the invention.

Referring now to FIG. 6, the use of frequent-value statistics is shown. FIG. 6 illustrates the frequency list as a bar graph, in descending order of frequency. Suppose that the table has d distinct values in total, and a total cardinality of C. Then the successive bar heights are $f_1, f_2, \ldots f_{m+n}$, $count_{rare}$, $count_{rare}, \ldots, count_{rare}$ (d−m−n times), where $f_1, f_2, \ldots, f_{m+n}$ is $\{fv_1, \ldots fv_n, cfv_1, \ldots cfv_m\}$ arranged in descending order, and $count_{rare} = (C - f_1 - f_2 - \ldots - f_{m+n})/(d-m-n)$.

SPA now determines the number K of frequent values to maintain, where $n \leq K \leq m+n$. If DB2 maintains K frequent values, then, when estimating cardinalities, the optimizer uses the exact count for these values and an average count of $$newcount_{rare} = \left(C - \sum_{i=1}^{K} f_i\right) / (d - K)$$

for each of the remaining values. The total absolute estimation error over all possible simple equality predicates is $$AbsError(K) = \sum_{i=K+1}^{m+n} |f_i - newcount_{rare}| + (d - m - n)|count_{rare} - newcount_{rare}|$$

The first term represents the contribution due to the m+n−K known frequencies that DB2 ignores, and the second term is the contribution from the remaining values. Observe that AbsError(K) is decreasing in K. To determine the number of frequent values to maintain, the invention initially sets K=n and then increase the value of K until either K=m+n or AbsError(K) falls below a specified threshold.

AbsError can be incrementally computed for each value of $n_1$. Therefore the invention chooses a suitable number of frequent values to maintain by repeatedly increasing $n_1$ till the improvement in $AbsError(n_1)$ falls below a predefined threshold.

The COA focuses on pairwise correlations between columns in a table, because experiments indicate that the marginal benefit of correcting for higher-order correlations is relatively small. For each pair of columns that appear jointly in a QFW record, the COA compares the actual selectivity of each conjunctive predicate to the product of the actual selectivity of the Boolean factors of the conjunct, assuming that this information is available. For example, suppose that simple equality predicates $p_1$ and $p_2$ are evaluated while processing a query, along with the conjunctive predicate $p_1 \wedge p_2$. Denote by $\alpha_1, \alpha_2$, and $\alpha_{12}$ cardinalities for these queries that are observed during execution of the query. Then the COA deems the independence assumption to be valid if and only if $$1 - \Theta \leq \frac{\alpha_{12} m}{\alpha_1 \alpha_2} \leq 1 + \Theta$$

where $\Theta \in (0,1)$ is a small prespecified parameter. Otherwise, the COA declares that a correlation error of absolute magnitude $|\alpha_{12} - \alpha_1 \alpha_2|$ has occurred.

The analysis becomes more complicated when one or more of the actual cardinalities are not available, as is often the case in practice. The COA deals with the problem by estimating the missing information and adjusting the error detection threshold and estimate of the error magnitude accordingly. See the Appendix for more detail.

The QFA processes feedback records as described above, grouped either by column name or, for records involving column pairs, by column-group identifier, where a column-group identifier comprises the pair of column names enumerated in lexicographic order. The QFA then sums up the absolute errors for each column and column group and records the column-wise or group-wise error in the appropriate recommendation table. Next, the QFA identifies those columns and column groups that are responsible for the most severe errors. QFA modifies the RUNSTATS profile so that RUNSTATS will increase the number of frequent-value statistics for each identified column and create joint statistics for each identified column group when it is next executed on the table that contains the column or column group. Finally, the QFA computes the total error for each table by combining the errors for table cardinality, cardinality of simple predicates, and cardinality of pairwise conjunctive predicates. Based on these table-wise errors, the QFA sends to the scheduler a prioritized list Q of tables on which to execute RUNSTATS.

Referring now to FIG. 7, a scheduling algorithm for statistics collection is shown. The scheduler drives the statistics collection process. During periodic maintenance iterations that occur during corresponding maintenance windows, the scheduler periodically calls the AA and QFA, and combines the output D of the AA and the output Q of the QFA to maintain a combined prioritized list P of tables to be processed. The scheduler also invokes RUNSTATS as a background process to collect statistics on those tables having the highest priority, provided that sufficient system resources are available. The algorithms for prioritizing and re-prioritizing the tables form the heart of the scheduling algorithm, as does the algorithm for updating the list G that is input to AA.

The DBA can control the behavior of autonomic background activities by configuring the scheduler. For example, the DBA can limit the scope of automated statistics collection to certain tables. The DBA can also specify the maintenance window, i.e., the time period during which a maintenance iteration occurs and in which RUNSTATS may be executed on one or more tables. Finally, the DBA can also control whether the scheduler should invoke QFA, AA, or both, and specify the maximum allowable disk space for the QFW.

Prioritizing tables for processing is an important and challenging task. For large databases with potentially thousands of tables and terabytes of data, selecting the wrong tables for statistics collection might mean that very needy tables will have to wait an unreasonable length of time, with detrimental effects on query performance.

The scheduler classifies tables into five distinct "urgency" classes. A table is useful with respect to statistics refresh if more than 0% but less than 50% of the rows have experienced some data change since the last statistics refresh. A table is needed if it has been recommended for processing by the QFA. A pressing table has had 50% or more rows experience change since the last statistics refresh. An urgent table is both needed and either pressing or useful. A critical table is a table that has been starved: an excessive number of maintenance iterations have passed since the last statistics refresh. If a table falls into more than one class, then the most urgent of the categories defines the table's classification.

Each table recommended by AA or QFA is classified into one of the foregoing classes. Critical tables are ranked above urgent tables, which are ranked above pressing tables, and so forth. The tables are then ranked within each class, resulting in a priority queue that specifies the order in which tables are selected for statistics refresh.

Useful tables are ranked within their class by the percentage of rows changed, and similarly for pressing tables. Tables within both the needed and urgent classes are ranked by their frequency count, where the frequency count of a table is the number of error records in the QFW that reference the table. The frequency count is a measure of a table's relative importance within the workload. Finally, critical tables are ranked by their data change rate. This ranking scheme ensures that a single table never appears more than once in the queue.

The rationale for the ranking scheme is as follows. It is useful to refresh statistics on tables that experience low to moderate data change, but which have not been detected by QFA as impacting the workload, in case theses tables are accessed by the workload in the future. Such refresh activity should be subject to preemption by more important tasks. Tables that are known to be accessed by the workload and have obsolete statistics clearly need a statistics update. Tables that have experienced massive data change will likely cause massive query optimization problems if their statistics are not refreshed. Finally, we allow the scheduler to identify tables as critical in order to avoid starvation problems in which tables are deferred indefinitely.

After RUNSTATS has been executed on a table T, the newly collected statistics N for T are stored in the system catalog. The scheduler now invokes the change analyzer again to estimate the rate of change of the statistics, using N and the previous set of statistics R for T. Based on this rate of change the scheduler determines the next maintenance interval at which T will be due for consideration by AA.

The list G that is input to the AA is initialized prior to the first maintenance window. At the end of the maintenance window, the constructDueTables procedure (of FIG. 7) is invoked to create the list G of tables due to be checked by AA in the next iteration. This function also constructs the list C of tables that are now critical (as previously defined).

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the particular SYSTEM AND METHOD FOR UPDATING DATABASE STATISTICS ACCORDING TO QUERY FEEDBACK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

Appendix

Definitions and Notation

We assume a conjunctive query $$Q = p_1 \wedge p_2$$

on a single table T having row cardinality $\mu$. Let $\epsilon_1$ and $\epsilon_2$ denote the cardinality estimate of $p_1$ (resp., $p_2$), and let $\epsilon_2$ denote the cardinality estimate of $$Q = p_1 \wedge p_2$$

Also let m denote the estimated row cardinality of T Corresponding to $\epsilon_1$, $\epsilon_2$, and $\epsilon_{12}$, let $\alpha_1$, $\alpha_2$, and $\epsilon_{12}$ denote the cardinality actuals observed during execution of the query. We relate the estimates and actuals by an error factor, that is $\epsilon_i = \alpha_i(1 + \epsilon_i)$, thus $$\delta_i = \frac{\epsilon_i - \alpha_i}{\alpha_i} \text{ for } i \in \{1, 2, 12\}$$

denotes the relative error. We assume throughout that $$\delta_i \geq -1$$

so that $$\epsilon_i \geq 0$$

Correlation Detection

When verifying whether the predicates $p_1$ and $p_2$ are correlated, we distinguish the following 3 cases depending on the available information. We assume that estimate information is always available, and that the error in estimating $\mu$ by m is small relative to the other errors. (Under the latter assumption, we can use $\mu$ and m interchangeably.)

Case 1 (perfect information: $\alpha_1$, $\alpha_2$, $\alpha_{12}$ known):

Given $\alpha_1$, $\alpha_2$, $\alpha_{12}$, it suffices to verify the independence assumption on the actual information, i.e., to test whether $$(\alpha_1/\mu)(\alpha_2/\mu) = (\alpha_{12}/\mu)$$

holds to within a threshold $$\Theta \in (0, 1)$$
$$1 - \Theta \leq \frac{\alpha_{12} m}{\alpha_1 \alpha_2} \leq 1 + \Theta, \quad = \text{Independence}$$

Case 2 (only $\alpha_1$, $\alpha_{12}$ known):

Given $\alpha_1$, $\alpha_{12}$, we distinguish two subcases:

Subcase 2.1 ($\alpha_1 = \alpha_{12}$): If $\alpha_1 = \alpha_{12}$, there must be a functional dependency between the two predicates $p_1$ and $p_2$. We therefore can conclude that p1 and p2 are correlated without needing to know 2.

Subcase 2.2 ($\alpha_1 \neq \alpha_{12}$): We replace the missing parameter $\alpha_2$ by its estimate $\epsilon_2$ and associate an unknown error $\delta_2$ with the latter quantity. We then check, as before, whether the relation $\alpha_1 \alpha_2 = \alpha_{12}$ holds.

Option 1: For a threshold $$\Theta \in (0, 1)$$
$$1 - \Theta \leq \frac{\alpha_{12} m}{\alpha_1 \frac{\epsilon_2}{1 + \delta_2}} \leq 1 + \Theta$$

$\Leftrightarrow$independence

Assuming a default value $$\gamma \leq 1$$

such that $$|\delta_2| \leq \gamma$$

and using conservative bounds (i.e., bounds such that large errors are required before we declare the presence of correlation), we get, $$\frac{1 - \Theta}{1 + \gamma} \leq \frac{\alpha_{12} m}{\alpha_1 \epsilon_2} \leq \frac{1 + \Theta}{1 - \gamma} = \text{independence}$$

Option 2: We can develop a criterion that depends only on the error terms. (In this connection, observe that both $$\delta_1$$

and $$\delta_{12}$$

are known in the current scenario.) Suppose that $$\epsilon_{12}$$

is estimated as $$\epsilon_1 \epsilon_2 / m$$

and that the independence assumption holds. Then $$\frac{\epsilon_1 \epsilon_2}{m} \approx \frac{\epsilon_1 \epsilon_2}{\mu} = \frac{\alpha_1 \alpha_2}{\mu}(1 + \Delta) = \alpha_{12}(1 + \Delta)$$

where $$\Delta = \Delta(\delta_1, \delta_2) = \delta_1 + \delta_2 + \delta_1 \delta_2$$

It follows that $$\delta_{12} = \frac{\epsilon_1 \epsilon_2 m^{-1} - \alpha_{12}}{\alpha_{12}} \approx \Delta.$$

Thus, for some small threshold $$\Theta \in (0,1)$$

and default value $$\gamma \leq 1$$

such that $$|\delta_2| \leq \gamma$$

$$(1-\Theta)\Delta_{min} \leq \delta_{12} \leq (1+\Theta)\Delta_{max}$$

$\Leftrightarrow$independence, where $$\Delta_{min} = \delta_1 \oplus \gamma - \delta_1 \gamma$$

and $$\Delta_{max} = \delta_1 + \gamma + \delta_1 \gamma$$

Option 3: An equivalent approach is to compute how large the unknown error $\delta_2$ would be under the assumption of independence, i.e., solve the equation $$\delta_1 + \delta_2 + \delta_1 \delta_2 = \delta_{12}$$

for $\delta_2$. This results in:

$$\delta_2 = \frac{\frac{\epsilon_{12} - \alpha_{12}}{\alpha_{12}} - \frac{\epsilon_1 - \alpha_1}{\alpha_1}}{1 + \frac{\epsilon_1 - \alpha_1}{\alpha_1}}$$

If the absolute value of $\delta_2$ is larger than a default maximal absolute error $\Phi$ that we assume for a single predicate, then we assume correlation, i.e., $|\delta_2|>\phi$ implies correlation Case 3 (only $\alpha_{12}$ known):

Given only $\alpha_{12}$, we replace the missing $\alpha_1$ and $\alpha_2$ values by their estimates $\epsilon_1$ and $\epsilon_2$ and associate unknown errors $\delta_1$ and $\delta_2$ with these estimates. We then again check whether the relation $\alpha_1\alpha_2=\alpha_{12}\mu$ holds.

Option 1: For a threshold $$\Theta \in (0, 1)$$

$$1-\Theta \leq \frac{\alpha_{12}m}{\frac{\epsilon_1}{1+\delta_1}\frac{\epsilon_2}{1+\delta_2}} \leq 1+\Theta$$

$\Leftrightarrow$ independence

Assuming a default value $$\gamma \leq 1$$

such that $$|\delta_1| \leq \gamma$$

and $$|\delta_2| \leq \gamma$$

and using a conservative approach as before, we get:

$$\frac{1-\Theta}{1+\Delta_{max}} \leq \frac{\alpha_{12}}{\alpha_1\epsilon_2} \leq \frac{1+\Theta}{1+\Delta_{min}}$$

$\Leftrightarrow$ independence, where $$\Delta_{min}=\gamma^2-2\gamma$$

and $$\Delta_{max}=\gamma^2+2\gamma$$

Option 2: As before, use the fact that $$\delta_{12}\approx\Delta$$

under the independence assumption. For some small threshold $$\Theta\in(0,1)$$

and default value $$\gamma\leq 1$$

such that $$|\delta_1|\leq\gamma$$

and $$|\delta_2|\leq\gamma$$

$$(1-\Theta)\Delta_{min}\leq\delta_{12}\leq(1+\Theta)\Delta_{max}$$

$\Leftrightarrow$ independence where $$\Delta_{min}=\gamma^2-2\gamma$$

and $$\Delta_{max}=\gamma^2+2\gamma$$

as above.

Option 3: A final (though somewhat more suspect) approach is to assume that the unknown errors $\delta_1$ and $\delta_2$ are in fact equal, i.e, $\delta_1=\delta_2$. We then can compute how large the unknown error $\delta_1$ would be under the independence assumption. Solving $$\delta_1^2+2\delta_1-\delta_{12}=0$$

for $\delta_1$, we obtain $$\delta_1=\sqrt{1+\delta_{12}}-1$$

Note that we take the positive square root to avoid values of $\delta_1$ that are less than $-1$ the formula is well defined since $$\delta_{12}>-1$$

If the absolute value of $\delta_1$ is larger than a default maximal absolute error $\Phi$ that we assume for a single predicate, we assume correlation, i.e., $|\delta_1|>\phi \Leftrightarrow$ correlation.

What is claimed is:

1. A computer-implemented method of accelerating database query processing, comprising:
   implementing data-centric operations comprising:
      observing data value changes to tables; and
      recording database statistics based on the data value changes to the tables;
   implementing query-centric operations comprising:
      monitoring execution of a query based on the recorded database statistics; and
      storing query feedback in a query feedback warehouse, wherein the query feedback comprises empirical performance results gathered during the execution of the query;
   selectively collecting and saving improved database statistics based on the query feedback and the data observations, wherein the collecting further comprises:
      ranking data sources in descending order of probable error; and
      pursuing improved statistics for the data sources in that ranked order; and
   choosing query execution plans according to the improved database statistics.

2. The method of claim 1, wherein the data value changes result from at least one of the following: update operations, delete operations, insert operations, load operations, a count of any of the operations.

3. The method of claim 1, wherein the query feedback includes at least one of the following: query predicates, actual cardinalities for relational query expressions, estimated cardinalities for relational query expressions, estimated selectivities, actual selectivities.

4. The method of claim 1, wherein the collecting further comprises:
   gathering statistics only where most valuable at reducing error; and
   purging less valuable database statistics and query feedback.

5. The method of claim 1, wherein the collecting further comprises:
   determining the causes of error in existing database statistics; and
   initiating an existing statistics collection routine with desired statistics and configuration parameters selected to correct the errors in existing database statistics.

6. The method of claim 5, wherein the causes include at least one of:
   correlation between purportedly independent data sources, outdated statistics, statistics having too few frequent values.

7. The method of claim 6, wherein correlation is detected by:
   assuming data independence for selectivity estimation;
   checking whether actual selectivities support the assumption; and
   when the assumption is not sufficiently supported then concluding correlation exists and recommending more detailed statistical monitoring of the data.

8. The method of claim 6, wherein outdated statistics are detected by:
   checking whether feedback is available for particular data and when feedback is not available then deeming the statistics to be outdated;
   when feedback is available then comparing relative differences between estimated values and actual values with a predetermined threshold; and
   when the differences exceed the threshold then deeming the statistics to be outdated.

9. The method of claim 1, wherein the observing further comprises sampling data.

10. The method of claim 1, wherein the collecting further comprises sampling data.

11. The method of claim 1, wherein the statistics include at least one of: correlation between columns of a table, skew between columns, correlations between columns in multiple tables, correlated columns based on selectivity values for predicates involving those columns, correlated columns based on cardinality values for predicates involving those columns.

12. The method of claim 1, wherein the statistics include at least one of: a table, a number of rows of a table, indexes of a table, columns of a table, indexes of a table, clustering of an index, height of an index, number of distinct index keys.

13. The method of claim 1, wherein the statistics include at least one of: number of distinct values for a column, number of frequent values for a column, most frequent values for a column, distribution parameters for a set of columns, a set of column groups, distribution parameters for a set of column groups.

14. The method of claim 1, further comprising creating statistical profiles for each data source where existing statistics are inadequate.

15. The method of claim 14, wherein the statistical profiles include: a column, a column group, distribution parameters for each column, distribution parameters for each column group, a number of frequent values, a number of quantiles.

16. The method of claim 1, further comprising selectively enabling a database administrator to influence all aspects of the method.

17. A computer program product comprising a machine readable storage medium having computer readable program code thereon for accelerating query processing, wherein the computer readable program code comprises instructions for:
   implementing data-centric operations comprising:
      observing data value changes to tables; and
      recording database statistics based on the data value changes to the tables;
   implementing query-centric operations comprising:
      monitoring execution of a query based on the recorded database statistics; and
      storing query feedback in a query feedback warehouse, wherein the query feedback comprises empirical performance results gathered during the execution of the query;
   selectively collecting improved database statistics based on the query feedback and the data observations, wherein the collecting further comprises:
      ranking data sources in descending order of probable error; and
      pursuing improved statistics for the data sources in that ranked order; and
   choosing query execution plans according to the improved database statistics.

18. A commercial service for accelerating query processing that provides a user with a fee-selectable opportunity to enable an autonomic query optimizer that reduces the need for database administrator intervention by:
   implementing data-centric operations comprising:
      observing data value changes to tables; and
      recording database statistics based on the data value changes to the tables;
   implementing query-centric operations comprising:
      monitoring execution of a query based on the recorded database statistics; and
      storing query feedback in a query feedback warehouse, wherein the query feedback comprises empirical performance results gathered during the execution of the query;
   selectively collecting improved database statistics based on the query feedback and the data observations, wherein the collecting further comprises:
      ranking data sources in descending order of probable error; and
      pursuing improved statistics for the data sources in that ranked order; and
   choosing query execution plans according to the improved database statistics.

* * * * *